United States Patent [19]
Brandt

[11] 3,844,740
[45] Oct. 29, 1974

[54] EXHAUST GAS TREATMENT

[75] Inventor: Herbert Brandt, Gutehoffnungsring, Germany

[73] Assignee: Apparatebau Rothemuhle Brandt & Kritzler, Wenden, Ortsteil Rothemuhle, Germany

[22] Filed: Dec. 10, 1973

[21] Appl. No.: 423,175

[30] Foreign Application Priority Data
Oct. 11, 1973  Germany...................... 2351048

[52] U.S. Cl........................... 55/83, 55/84, 55/222, 55/265, 261/17, 261/133
[51] Int. Cl............................................. B01d 47/00
[58] Field of Search.......... 55/80, 84, 83, 322, 265, 55/267–269, 261; 261/DIG. 9, 17, 79 A, 128, 133

[56] References Cited
UNITED STATES PATENTS

| | | | |
|---|---|---|---|
| 1,279,895 | 9/1918 | Minton | 261/17 |
| 1,912,381 | 6/1933 | Meston | 55/269 X |
| 2,937,141 | 5/1960 | Helwig | 55/267 X |
| 3,150,943 | 9/1964 | Darrow et al | 55/261 |
| 3,466,853 | 9/1969 | Buick et al | 55/1 |
| 3,473,298 | 10/1969 | Berman | 55/268 X |
| 3,687,630 | 8/1972 | Tailor | 423/242 |
| 3,760,567 | 9/1973 | Stalker | 55/269 X |

FOREIGN PATENTS OR APPLICATIONS

| | | | |
|---|---|---|---|
| 849,349 | 3/1951 | Germany | 55/261 |
| 1,271,296 | 6/1968 | Germany | 55/222 |

*Primary Examiner*—Frank W. Lutter
*Assistant Examiner*—Vincent Gifford
*Attorney, Agent, or Firm*—Elliot A. Lackenbach

[57] ABSTRACT

In a plant and method for purification of waste gases in which the gases are wet-cleaned which cools them, then reheated by heated air, problems of clogging or corrosion during the reheating are avoided by providing for introduction of the wet gas and hot air into a mixing flue in envelopes wherein the latter surrounds the former during reheating so that there is substantially avoided contact between any surfaces and gases below the dew-point of the latter. A coaxial flue portion is shown for this purpose, gas being introduced by the central duct and air by the cylindrical annulus surrounding it. The air is preferably given a rotational flow so that an envelope of it is maintained outside the gas for some way beyond the end of the coaxial part of the flue. Preferably the air for the reheating is heated by indirect heat exchange with the hot exhaust gases before they are wet-cleaned.

7 Claims, 3 Drawing Figures

EXHAUST GAS TREATMENT

FIELD OF THE INVENTION

The invention relates to exhaust gas treatment plants and methods in which exhaust gas from a boiler plant or the like is subjected to the action of a liquid which cools the gas and saturates it with water vapour, and is then reheated.

BACKGROUND OF THE INVENTION

Plants and methods of this kind are used for cooling exhaust gases and, when water is used as the liquid, particularly for cleaning them so that they are free of harmful or damaging substances, or for subjecting the gases to some other physical or chemical treatment. It is usual in wet-purification, in order to get efficient purification, to cool the gases with water up to the point at which the gases are saturated with the latter and they are even, when cooled, above the temperature, dew point and moisture content of the ambient atmosphere; also after such cooling the exhaust gases usually contain liquid phase residues, such as mists or droplets. These may in themselves be harmful or corrosive or may carry substances which can clog. The high moisture content of the gas, either as liquid droplets or vapour, and the nature of the gas and any droplets present or formed cause particular problems, when it is desired to reheat the cooled gas.

In German Patent No. 1271296 (a prior proposal of my own) I show the use of a rotary regenerative preheater for the purpose of reheating the cooled gases by indirect heat exchange with a hot gas, something which is now found hardly to be economically viable for these reheating purposes because of the difficulties encountered with clogging and/or corrosion in the preheater.

SUMMARY OF THE INVENTION

The invention has the object of eliminating such operating difficulties and preventing such damage.

This object is realised by arranging for the reheating of the exhaust gas to take place by heat exchange in an introductory portion of a flue in which the reheated gas and hot gas are to mix. This heat exchange is assisted by a tubular duct for the gas projecting into the flue, the hot gas flowing through an annular space defined between this tubular duct and the inner wall surface of the flue.

In an advantageous feature of the inlet duct of gas into the flue may be so constructed that when the hot air is introduced into the annular space it flows in a rotating or spiral path in the flue. This introduction is effected by means of a tangential inlet pipe or by means of metal guide blades. It is also preferred that the hot gas be heated by indirect heat exchange with the exhaust gas before the latter is cooled. The hot gas may, however, be a portion of the exhaust gas taken off before cooling and cleaned by dry methods, or maybe hot gas from any other heat source.

The heating of the wet or moist exhaust gas by the dry hot gas (which will usually be air) then take place in such a manner that the hot gas first of all heats the wall of the duct from the outside, and also heats the lower portion of the flue, so that there is indirect heat exchange, and after this pursues a rotating path in the next portion of the flue during which it flows round the wet exhaust gas, thereby preventing contact of this wet exhaust gas with the wall of the flue until the gas has been sufficiently heated by direct heat-exchange, as a result of a mixing action which takes place under the effect of the turbulence of flow, so as to prevent condensation on the wall of the flue, and also to prevent the formation of droplets in the surrounding air after the gases have left the mouth of the flue.

The advantages afforded by the invention are as follows:

1. the walls with which the wet cool exhaust gas comes into contact are heated to a temperature above the dew point temperature, 2. a "jacket" of hot dry air is formed between the cool wet exhaust gas and the portions of the flue wall which are not heated from the outside, and 3. the exhaust gases are adequately heated and dried by an admixture of hot air.

DESCRIPTION OF THE DRAWINGS

Embodiments of the invention are diagrammatically illustrated in the drawings, in which:

In FIG. 3 temperatures and dew points at different areas of the plant are given by way of example.

DESCRIPTION OF THE PREFERRED EMBODIMENTS

Figure 1:
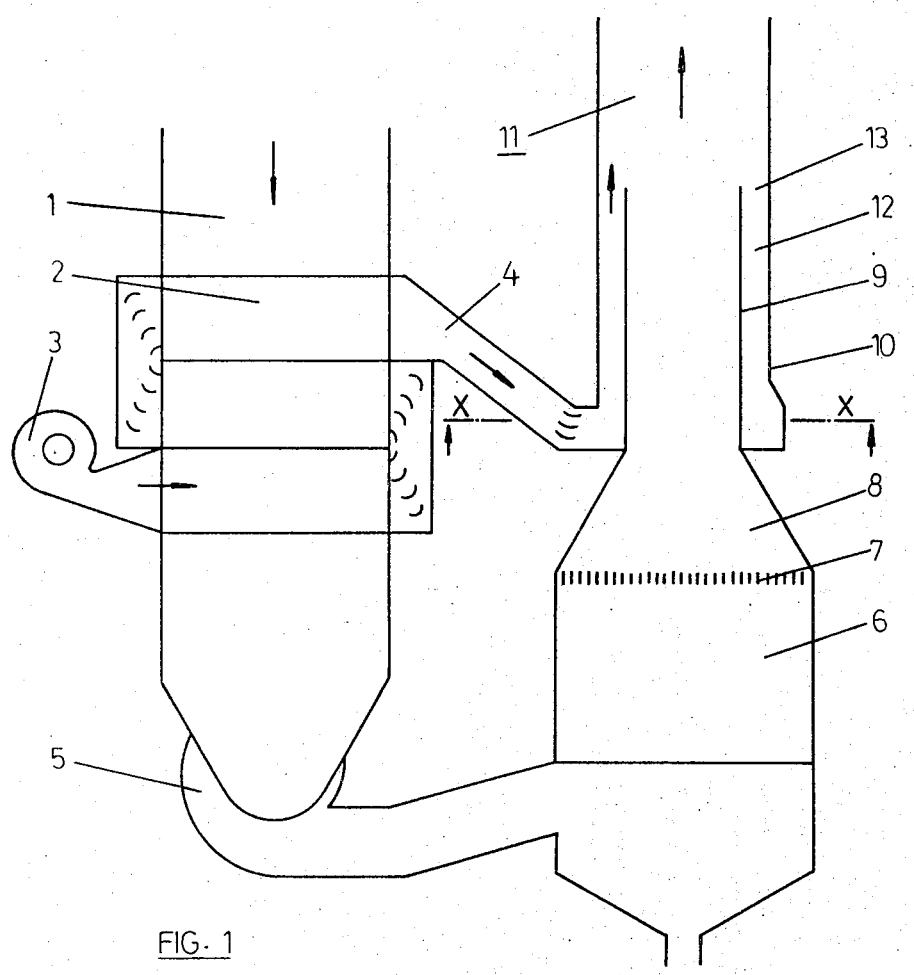
FIG. 1 shows an arrangement of the proposed wet cleaning plant.
Figure 2:
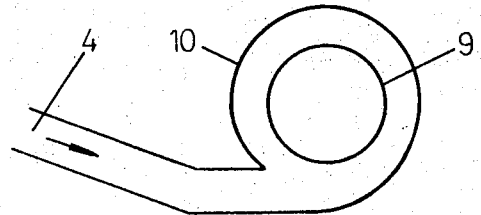
FIG. 2 is a cross-sectional view of the flue in the plane designated by X in FIG. 1, and shows a tangential inlet into an annular space in an introductory portion of a flue.
Figure 3:
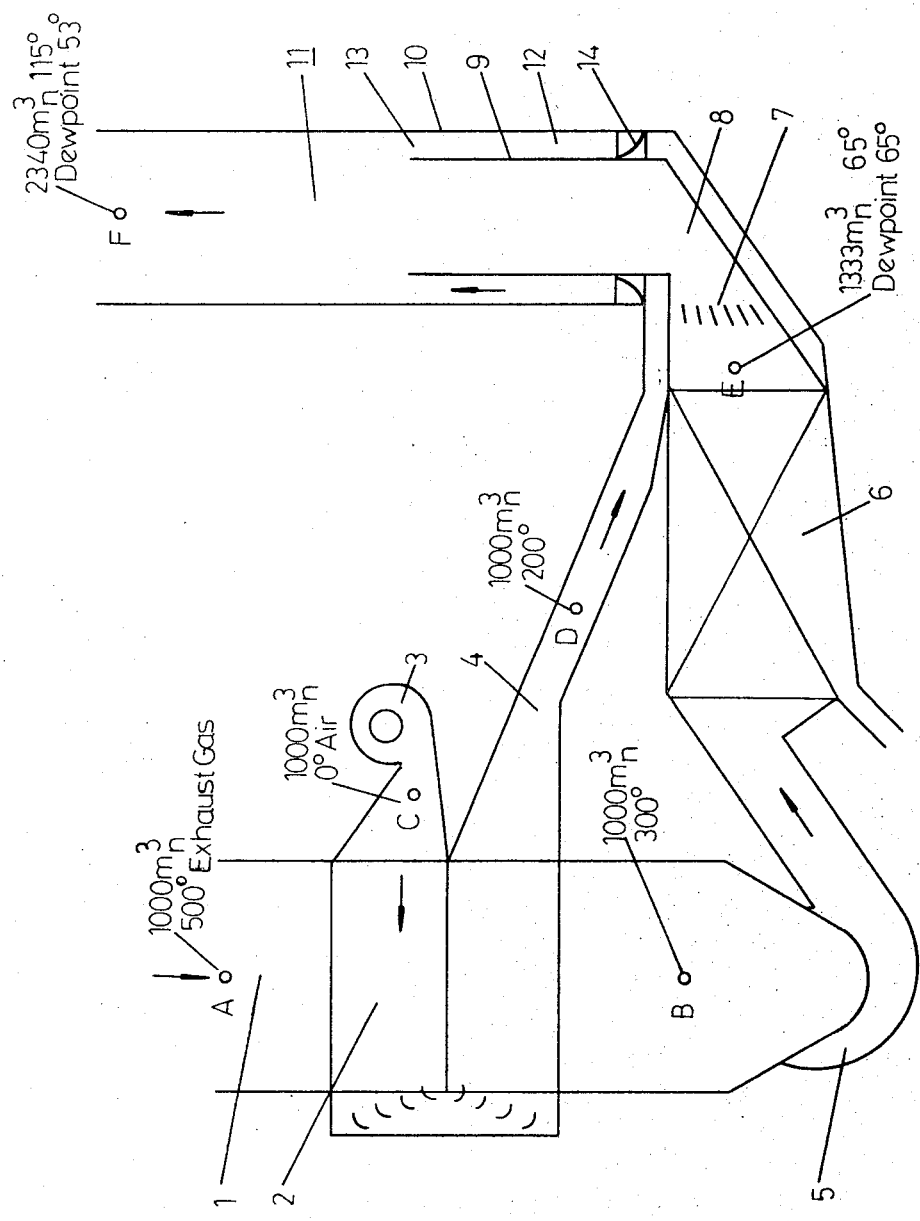
FIG. 3 shows a wet electrofilter, and metal guide blades in the lower part of the flue, these blades serving to produce a rotating or helical movement of the hot air.

As FIG. 1 illustrates, hot exhaust gas flows from a firing equipment (not shown), through a duct 1 to a conventional indirect heat exchange 2, through which a fan 3 blows air. This air, heated in the heat exchanger 2, flows directly, by way of a duct 4, to the exhaust gas flue 11. The exhaust gas cooled in the heat exchanger 2 is blown by a fan 5 to a wet gas-cleaning assembly 6, in which the exhaust gas is brought into intimate contact with water, which washes or scrubs out the substances which it is desired to remove from the exhaust gas. In this way the exhaust gas is unavoidably cooled to its dew point. The wet cleaning assembly 6 may be a spraying assembly, a washing (scrubbing) tower, a mechanical scrubber, a wet electrofilter, or any other suitable device for carrying out the same wet cleaning function. A droplet catcher 7, located over the wet cleaning assembly, holds back by far the greater proportion of water droplets which have come from the wet cleaning assembly, a relatively small amount of very fine droplets and mist remaining behind in the exhaust gas. The wet, cool, exhaust gas flows, by way of duct 8, into an inlet duct 9 within an introductory portion of the flue 11. The hot air duct 4 passes tangentially into the tube 10 of the flue which surrounds the inlet duct 9, as is illustrated in FIG. 2, or (as is illustrated in FIG. 3) the tube 10 is provided with metal guide blades or vanes 14, which lie in the vicinity of or downstream of the point at which the hot air duct 4 meets the tube 10. Consequently, the hot air in the annular space 12 between the duct 9 and tube 10 in the lower portion of the flue has a rotating or helical path round the inlet duct 9, and heats the wall of the latter.

The length of the duct 9 within the flue is preferably 3 to 5 times the diameter of the outer tube 10. The current of hot air, still pursuing its rotating or helical path, flows through the mouth 13 of the annular space 12 into the adjacent portion of flue 11, where its helical path of flow causes it to be initially confined to contact with the tube 10 of the flue. However, owing to the turbulence of flow, the hot air gradually mixes with the cool exhaust gas, thereby heating the latter. This rotation of the hot air prevents the exhaust gas — so long as the exhaust gas has not appreciably exceeded the dew point temperature — from coming into contact with the outer tube 10 of the flue 11. The outer tube 10 is self-supporting.

FIG. 3 illustrates a somewhat similar embodiment to that shown in FIG. 1, analogous or the same parts, in a slightly different spatial relationship, being given the same reference numbers as in FIG. 1. Here there is also given data, provided by way of example only, concerning quantities, temperatures and dew points, these data showing the effect of the plant on the exhaust gas. The principles whereby the plant is dimensioned are explained below; for the purpose of simplifying the explanation, the specific heats and specific gravities, which only vary by a small amount, of the dry and wet exhaust gases and of the air are compared with one another, and the air and hot exhaust gas flowing into the plant are considered as being free of water vapour.

At A 1000 $m_n^3$ (standard cubic metres) of dry exhaust gas, at 500°C for example, flow into the plant and, by the time they reach B, have cooled to 300°C, while for example 1000 $m_n^3$ of air arriving from C, where this air has a temperature of (say) 0°C, has been heated to 200°C by the time it reaches D. The exhaust gas is cooled in the wet cleaning assembly, due to supplying the latent heat for evaporating water. Through saturation of the exhaust gases with water vapour the exhaust gas is cooled to about 65°C by the time it reaches E, as can be calculated by known computational methods. When the exhaust gas has a temperature of 65°C, the partial pressure of the water vapour is about 0.25 atm., a quarter of the exhaust gas being constituted by water vapour at point E. Accordingly, the quantity of the wet exhaust gases amounts to 1333 $m_n^3$ at point E, the temperature of these gases being 65°C, and the dew point 65°C. About 10 kg of very fine water droplets and mist may be present in the wet exhaust gases. The 10 kg of droplets evaporates during the mixing action of these cool wet exhaust gases from point E with the dry hot air flowing from point D. The heat of vaporisation of the 10 kg of droplets of 560 kcal/kg cools the 1000 $m_n^3$ of hot air, which has a specific heat of about 0.3 kcal/$m_n^3$ °C, by $10 \times 560/1000 \times 0.3 = 19°$, thus reducing the temperature of the air to $200-19=181°C$. At the same time the amount of exhaust gas is increased to 1340 $m_n^3$ owing to the 10 kg of droplets which have evaporated. As a result of the mixture of 1000 $m_n^3$ at 181°C with 1340 $m_n^3$ at 65°C there will be 2340 $m_n^3$ at 115°C at point F. The partial pressure of the water vapour is reduced to $340/2340=0.148$ atm., which corresponds to a dew point of about 53°C. Thus, a further advantage is realised insofar as, for example, the exhaust gas is heated from 65° to 115°C and is equivalently dried in that its dew point is lowered from 65° to 53°.

The choice of mixing temperature and also of the quantity and temperature of the hot air may be made by the supervising engineer so as to suit prevailing conditions.

Principal elements of the invention, as exemplified in the above embodiments are; a heat exchanger (2) in which the hot exhaust gas heats air to at least 150° to 200°; an inner tube (9) and an outer tube (10), located in a flue (11), cool wet exhaust gas flowing through the inner tube (9), while hot air flows through the annular space (12) defined between the outer and inner tubes (9,10); an inlet pipe (4) for the hot air, this inlet pipe debouching tangentially into the annular space or at the metal guide plates (14), so that a rotating or helical flow is imparted to the hot air in the annular space; a mouth (13) of the annular space, by means of which hot air can flow from the latter into adjacent space of the flue; the hot air emerges from the annular space, forming a sheath or jacket round the cool gases, and re-assumes contact with the wall of the flue owing to its rotating mode of flow, although the hot air gradually mixes with the exhaust gas owing to the turbulent flow, so that the exhaust gas becomes heated and is raised above its dew point.

I claim:

1. A wet treatment plant for hot exhaust gas comprising means for subjecting the exhaust gas to wet treatment, a flue having an outer tube and an inner tubular duct defining an annular space therebetween, means for providing a supply of gas heated to a temperature above the dew point of the wet treated exhaust gas, means for introducing the heated gas and the treated gas separately into the duct and the space respectively, said duct being shorter than said tube to define a common flue portion downstream thereof for mixing the gases together, and means for rotating the heated gas to form an envelope during the flow thereof through the annular space so that the treated gas is isolated thereby from said tube until heated by mixture with the heated gas within the common flue portion to a temperature above the dewpoint thereof.

2. The improvement as claimed in claim 1 wherein the hot gas is introduced into the space by means of a tangentially disposed inlet pipe whereby this gas pursues the rotating or helical flow in the flue.

3. The improvement as claimed in claim 1 wherein the hot gas is introduced into the space and passes guide vanes whereby this gas pursues the rotating or helical flow in the flue.

4. The improvement as claimed in claim 1 wherein the axial length of the duct in the flue is between about 3 and about 5 times the diameter of the outer tube.

5. The improvement according to claim 1 wherein said means for providing a supply of heated gas comprises an indirect heat exchanger for heat exchange between hot exhaust gas and the gas to be heated and means for passing the hot gas heated in the heat exchanger to the introducing means.

6. Method of wet treating hot exhaust gas and reheating it including the steps of:

a. treating the exhaust gas by a wet treating process, b. constraining the exhaust gas from the wettreating process into an inlet duct generally axially extending within an outer tube of a flue, c. passing the constrained exhaust gas from the inlet duct into the flue, d. heating a gas to a temperature above the dew point of the exhaust gas, e. constraining the heated gas into an annular space between the duct and the flue, f. rotating the heated gas during passage through the annular space to form an annular envelope between the inlet duct and the flue which continues downstream of the duct, g. passing the envelope of heated gas from the annular space into the flue, and h. gradually mixing the heated gas with the exhaust gas in the flue downstream of the duct and thereby heating the exhaust gas while isolating it from the outer tube.

7. Method according to claim 6 wherein the heated gas is heated by an indirect heat exchange between the gas to be heated and the exhaust gas before the wet-treatment of the exhaust gas.

* * * * *